United States Patent
Li et al.

(10) Patent No.: US 11,269,706 B2
(45) Date of Patent: Mar. 8, 2022

(54) SYSTEM AND METHOD FOR ALARM CORRELATION AND AGGREGATION IN IT MONITORING

(71) Applicants: Beijing Wodong Tianjun Information Technology Co., Ltd., Beijing (CN); JD.com American Technologies Corporation, Mountain View, CA (US)

(72) Inventors: Min Li, Mountain View, CA (US); Huasong Shan, Mountain View, CA (US); Yuan Chen, Mountain View, CA (US); Yunpeng Zhang, Mountain View, CA (US); Haifeng Liu, Mountain View, CA (US); Xiaofeng He, Mountain View, CA (US)

(73) Assignees: Beijing Wodong Tianjun Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 0 days.

(21) Appl. No.: 16/929,306

(22) Filed: Jul. 15, 2020

(65) Prior Publication Data
US 2022/0019497 A1   Jan. 20, 2022

(51) Int. Cl.
*G06F 11/07* (2006.01)
(52) U.S. Cl.
CPC ...... *G06F 11/0772* (2013.01); *G06F 11/0709* (2013.01); *G06F 11/0751* (2013.01)
(58) Field of Classification Search
CPC ............. G06F 11/0709; G06F 11/0751; G06F 11/0772
(Continued)

(56) References Cited

U.S. PATENT DOCUMENTS

| | | | |
|---|---|---|---|
| 6,249,755 B1 | 6/2001 | Yemini et al. | |
| 7,917,393 B2 | 3/2011 | Valdes et al. | |
| 9,053,000 B1 | 6/2015 | Lam et al. | |
| 9,652,316 B2 | 5/2017 | Gamage et al. | |
| 9,794,113 B2 * | 10/2017 | Ranjan | H04L 41/0613 |

(Continued)

FOREIGN PATENT DOCUMENTS

CN   111722984 A   *   9/2020

OTHER PUBLICATIONS

Hamid Reza Motahari-Nezhad, REgis Saint-Paul, Fabio Casati, Boualem Benatallah, Event correlation for process discovery from web service interaction logs, The VLDB Journal, 2011, DOI 10.1007/s00778-010-0203-9.

(Continued)

*Primary Examiner* — Chae M Ko
(74) *Attorney, Agent, or Firm* — China Science Patent & Trademark US LLC; Shanyun Lu

(57) ABSTRACT

A system for alarm correlation and aggregation. The system includes a computing device. The computing device has a process and a storage device storing computer executable code. The computer executable code, when executed at the processor, is configured to: provide a plurality of alarms triggered by components of the system; provide aggregation patterns; perform iteratively until a criterion is met: generating itemsets from the alarms using the aggregation patterns, computing a new aggregation pattern from the generated itemsets using frequent itemset mining, and updating the aggregation pattern using the new aggregation pattern to obtain updated aggregation patterns; and aggregate the alarms using the updated aggregation patterns to obtain aggregated alarms.

18 Claims, 6 Drawing Sheets

(58) Field of Classification Search
USPC .................................................... 714/37, 57
See application file for complete search history.

(56) References Cited

U.S. PATENT DOCUMENTS

| | | | | |
|---|---|---|---|---|
| 2008/0059856 A1* | 3/2008 | Lee | .................... | G01N 21/9501 |
| | | | | 714/728 |
| 2012/0151282 A1* | 6/2012 | Watanabe | ............. | G06F 11/076 |
| | | | | 714/49 |
| 2015/0154062 A1* | 6/2015 | Watanabe | ........... | G06F 11/0751 |
| | | | | 714/26 |
| 2019/0340614 A1* | 11/2019 | Hanis | .................... | G06K 9/6218 |
| 2020/0084086 A1* | 3/2020 | Gupta | .................... | H04L 41/065 |

OTHER PUBLICATIONS

Gabriel Jakobson, and Mark Weissman, Alarm correlation, IEEE Network, Nov. 1993: 52-59.

Herve Debar, and Andreas Wespi, Aggregation and correlation of intrusion-detection alerts, International workshop on recent advances in intrusion detection, LNCS 2212, 2001, 85-103.

Jian-Guang Lou, Qiang Fu, Shengqi Yang, Jiang Li, Bin Wu, Mining program workflow from interleaved traces, 2010, KDD'10: Proceedings of the 16th ACM SIGKDD International Conference on Knowledge Discovery and Data Mining, 2010, 613-622.

Chen Luo, Jian-Guang Lou, Qingwei Lin, Qiang Fu, Rui Ding, Dongmei Zhang, Zhe Wang, Correlating events with time series for incident diagnosis, KDD'14: Proceedings of the 20th ACM SIGKDD International Conference on Knowledge Discovery and Data Mining, 2014, 1583-1592.

* cited by examiner

```
01  Input: retrieved T (default 1 month) duration of alarm data
02     Iter: iteration to learn rules
03  Begin
04     pset={} //learned pattern set
05     for iteration < Iter or len(pset) changes:
06        if pset={}
07           generate itemsets using sliding window of len Len_IS(180sec)
08        else
09           generate itemsets using pset and Len_IS
10        pset=mine_patterns(pset)
11        iteration++
12     end for
13
14   End
15
```

FIG. 5A

```
01  Input: mined patterns pset, user defined aggregation rules Rset,
02         sliding window length len_agg(default 180s),
03         alarm_arr //alarms in the current sliding window
04  Begin
05     when latest alarm a received:
06        alarm_arr.append(a)
07        if the current window < Len_agg
08           continue;
09        else if the current window > Len_agg
10           newAlarmSet=pop the alarm_arr head until winlen(alarm_arr)=len_agg
11           send newAlarmSet
12        end if
13        aggregateAlarms(alarm_arr,pset)
14        aggregateAlarms(alarm_arr,Rset)
15     end when
16  End
17
18  Function aggregateAlarms(alarm_arr, pset)
19     for each alarmset aset in alarm_arr:
20        newAset=aset
21        for each alarm a in aset:
22           collect all consequents as cset in pset where antecedent=a
23           collect all subsequent alarms in alarm_arr as a set xset
24           for k in xset:
25              if k in cset: add k to newAset; delete alarm k; end If
26           end for
27        end for
28        update aset to newAset
29     end for
30  End Function
```

FIG. 5B

SYSTEM AND METHOD FOR ALARM CORRELATION AND AGGREGATION IN IT MONITORING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited in the "Reference" section or discussed in this specification are incorporated herein by reference in their entireties and to the same extent as if each reference was individually incorporated by reference.

FIELD

The present disclosure relates generally to the field of system monitoring, and more particularly to a system and method for correlating and aggregating alarms in data centers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Monitoring and anomaly detection in data centers helps IT operators and application owners detect and fix various system issues timely. The current anomaly detection methods tend to generate a large number of alarms, which can be overwhelming. In addition, the relationships between alarms are often missing. A large number of alarms plus the lack of relevant information about the alarms becomes a main obstacle to using monitoring and alarming system.

Therefore, an unaddressed need exists in the art to address the aforementioned deficiencies and inadequacies.

SUMMARY

In certain aspect, the present disclosure relates to a system for correlating and aggregating alarms. In certain embodiments, the system includes a computing device. The computing device has a process and a storage device storing computer executable code. The computer executable code, when executed at the processor, is configured to:

provide a plurality of alarms triggered by components of the system;

provide aggregation patterns;

perform iteratively until a criterion is met: generating itemsets from the alarms using the aggregation patterns, where each itemset comprises one or more of the alarms; computing a new aggregation pattern from the generated itemsets using frequent itemset mining; and updating the aggregation pattern using the new aggregation pattern to obtain updated aggregation patterns; and aggregate the alarms using the updated aggregation patterns to obtain aggregated alarms.

In certain embodiments, the criterion includes at least one of: a number of iterations equals to or is greater than an iteration threshold; and the new aggregation pattern is included in the aggregation patterns. The iteration is terminated when the first criterion is met or both the criteria are met.

In certain embodiments, the iteration threshold is a positive integer in a range of 1-1000. In certain embodiments, the iteration threshold is in a range of 30-300. In certain embodiments, the iteration threshold depends on the data received.

In certain embodiments, the frequent itemset mining uses apriori algorithm. In certain embodiments, the frequent itemset mining uses frequent pattern growth (FG-growth) algorithm, equivalence class transformation (Eclat) algorithm, or split and merge (SaM) algorithm.

In certain embodiments, the step of computing the new aggregation pattern is performed using a sliding window, a window length of the sliding window is in a range of 10 seconds to 60 minutes, and a step size of the sliding window is in a range of one second to 15 minutes. In certain embodiments, the window length of the sliding window is in a range of 30 seconds to 30 minutes, and the step size of the sliding window is in a range of 3 seconds to 7.5 minutes. In certain embodiments, the window size is 180 seconds, and the step size is 36 seconds. In certain embodiments, the window size is 60 seconds, and the step size is about 12 seconds. In certain embodiments, the window size is 30 seconds, and the step size is about 6 seconds. In certain embodiments, the step of generating itemsets is performed for a plurality of iterations, the window length for a later of the iterations is greater than the window length for an earlier of the iterations.

In certain embodiments, the computer executable code is configured to aggregate the alarms using a sliding window, a window length of the sliding window is in a range of 10 seconds to 60 minutes, and a step size of the sliding window is in a range of one second to 15 minutes. In certain embodiments, the window length of the sliding window is in a range of 30 seconds to 30 minutes, and the step size of the sliding window is in a range of 3 seconds to 7.5 minutes. In certain embodiments, the window size is 60 seconds, and the step size is about 12 seconds. In certain embodiments, the window size is 30 seconds, and the step size is about 6 seconds. In certain embodiments, the window length for aggregation is different from one or more of the window lengths used in generating itemsets and used in computing the new aggregation pattern.

In certain embodiments, the computer executable code is configured to aggregate the alarms using both user defined rules and the updated aggregation patterns.

In certain embodiments, the computer executable code is further configured to diagnose status of the system using the aggregated alarms.

In certain aspects, the present disclosure relates to a method for correlating and aggregating alarms. In certain embodiments, the method includes:

providing, by a computing device of a system, a plurality of alarms triggered by components of the system;

providing, by the computing device, aggregation patterns;

performing iteratively, by the computing device, until a criterion is met: generating itemsets from the alarms using the aggregation patterns, wherein each itemset comprises one or more of the alarms; computing a new aggregation pattern from the generated itemsets using frequent itemset mining; and updating the aggregation pattern using the new aggregation pattern to obtain updated aggregation patterns; and aggregating the alarms using the updated aggregation patterns to obtain aggregated alarms.

In certain embodiments, the criterion includes at least one of: a number of iterations equals to or is greater than an iteration threshold; and the new aggregation pattern is included in the aggregation patterns. In certain embodiments, the iteration threshold is a positive integer in a range of 1-1000. In certain embodiments, the iteration threshold is in a range of 30-300. In certain embodiments, the iteration threshold depends on the data received.

In certain embodiments, the frequent itemset mining is performed using apriori, FG-growth, Eclat, or SaM.

In certain embodiments, the step of generating itemsets is performed for a plurality of iterations, a window length for a later of the iterations is greater than a window length for an earlier of the iterations.

In certain embodiments, the step of aggregating the alarms is performed using a sliding window, a window length of the sliding window is in a range of 10 seconds to 60 minutes, and a step size of the sliding window is in a range of one second to 15 minutes. In certain embodiments, the window length of the sliding window is in a range of 30 seconds to 30 minutes, and a step size of the sliding window is in a range of 3 seconds to 7.5 minutes.

In certain embodiments, the step aggregating the alarms is performed using both user defined rules and the updated aggregation patterns.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 5A schematically depicts updating of learned patterns from alarm data according to certain embodiments of the present disclosure.

FIG. 5B schematically depicts aggregation of alarm data according to certain embodiments of the present disclosure.

DETAILED DESCRIPTION

Figure 1:
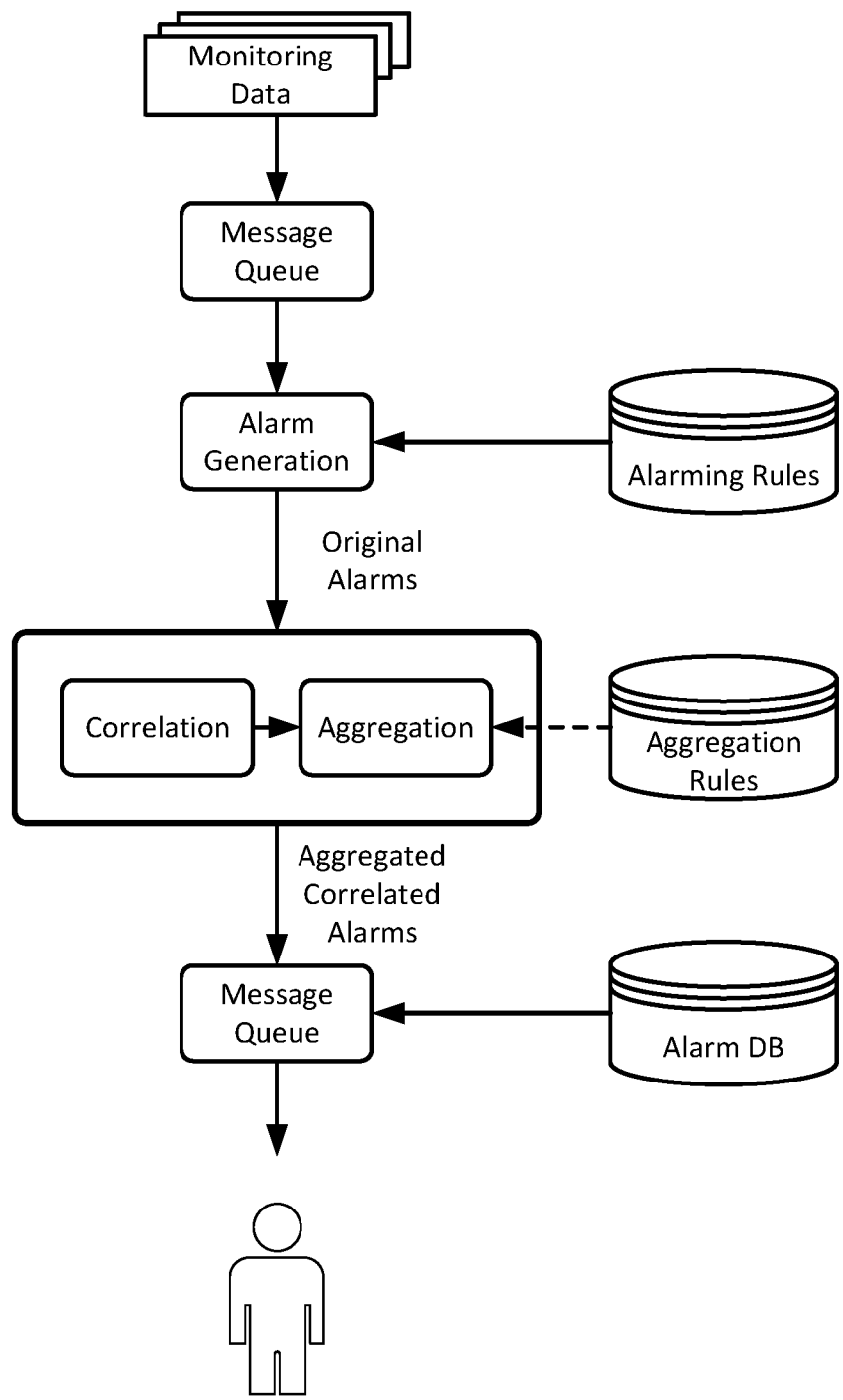
FIG. 1 schematically depicts a system architecture for alarm aggregation according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Unless otherwise defined, "first", "second", "third" and the like used before the same object are intended to distinguish these different objects, but are not to limit any sequence thereof.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

When an information technology (IT) system generates a large number of alarms, it is preferable to reduce the number of the alarms without losing information, and to identify the relationships between the alarms, so that the simplified alarms are easy for further analysis and process. In order to reduce the number of alarms sent to system managers or users, a system may aggregate alarms of the same type within a certain time window. But the method is not very effective as it fails to capture the correlations between different types of alarms and between the same type of alarms across time windows.

In certain aspects, the present disclosure provide a system for aggregating alarms by frequent itemset mining-based algorithm using a fixed time window. Frequent itemset mining mines the frequent patterns or items that correlated with each other in a given data set. In certain embodiments, it can be used to mine the correlated alarms given a set of alarm within the time window. Specifically, if two alarms co-occur together in a high probability, there is a high probability that the two alarms have a causality relationship or they are triggered by same errors. In certain embodiments, mining frequent itemsets consists of two steps: (1) discover itemsets that occur with a frequency of at least a minimum support count N; and (2) compute association rules from frequent itemsets that satisfy minimum support and minimum confidence. Support and confidence are two metrics to measure the quality of mined rules. The higher support and confidence an association rule has, the higher quality the rule is. Given an association rule A→B, the support refers to the percentage of itemsets in a dataset D that contains both A and B. The confidence means that the percentage of itemsets in a dataset D that contains A divided by the ones that contains both A and B. Minimum support and minimum confidence may be set based on empirical study. Although correlations between A and B can be captured, the sliding time window-based method tends to separate itemset randomly and hence misses some correlation and aggregation opportunities, and the aggregation rate is low due to its naive itemset generation.

In certain aspects, the present disclosure uses a simple yet novel algorithm named iterative frequent itemset mining to analyze the correlations between different types of alarms and aggregate the alarms that often occur at the same time period. It can significantly reduce the number of alarms sent to users. It can also provide valuable insights about the relationships between alarms, and hence help users perform problem diagnosis more efficiently. Compared with the other existing methods, this method is more effective in terms of aggregating correlated alarms and reducing the number of alarms. This method also provides more insights in diagnosing problems.

In certain embodiments, the key idea of the disclosure is to (1) analyze and mine alarms in the alarm history to capture the alarm correlation relationship using iterative frequent itemset mining algorithm; (2) aggregate the correlated alarms using mined rules; and (3) repeat the above process (1) and (2) until a certain criterion is met. In certain embodiments, a method of the disclosure performs frequent itemset mining in multiple iterations:

Step 1. Generate itemsets from the alarm history.

Step 2. Identify association rules using regular frequent itemset mining algorithm.

Step 3. Recompute itemsets that have high probability to contain alarms that are correlated with each other.

Step 4. Terminate if the newly generated association rules remain the same or the number of iterations exceeds a predefined threshold. Otherwise, go to Step 1.

Step 5. Apply mined association rules to aggregate alarms that are correlated within a sliding window.

As a result, in certain embodiments, the present disclosure provides a system that detects anomalies as alarms, correlates alarms to generate association rules, uses association rules to aggregate alarms and send alarms to end users. In certain embodiments, the present disclosure provides an iterative frequent itemset mining algorithm. The iterative algorithm mines correlations between alarms generated by monitored platforms to provide alarms correlation and reduce number of alarms generated. The iterative frequent itemset mining iteratively generates itemsets, mines association rules iteratively to improve the number and quality of mined rules. In certain embodiments, the present disclosure provides a sliding window based algorithm. Initially the itemsets are generated using a sliding window algorithm while the consecutive iterations generate itemsets using mined rules in previous iteration to reduce the probability to wrongly separate alarms into different sliding windows that are actually correlated.

FIG. 1 schematically depicts an architecture for alarm aggregation according to certain embodiments of the present disclosure. As shown in FIG. 1, the system monitors data, and created a message queue using the monitoring result. According to certain alarm rules, the system generates alarms from the message queue. The system sends the generated alarms to the analysis layer to obtain aggregated alarms based on the correlation between the alarms. The aggregated alarms, organized as a message queue, can be provided to the users to manage the alarms, and can also be sent to the alarm database and stored for future analysis.

The analysis layer includes a correlation component and an aggregation component. The correlation components analyze alarms to find correlations between the original alarms. The aggregation component uses the rules learned by the correlation component and the rules stored in the aggregation rules to aggregate alarms so as to obtain aggregated alarms. The aggregation rules may include the rules learned by the correlation component and rules predefined by the users. When the aggregation component aggregate the original alarms into aggregated alarms, the aggregated alarms can be further analyzed by the correlation component to mine new high level rules, and the new high level rules can be used by the aggregation component to aggregate the original alarms in a more efficient way. By iterations of the process, the rules learned by the correlation component are increased, and the number of alarms are reduced to a much smaller number by the aggregation component. As a result, the number of the output aggregated correlated alarms is minimized.

In certain embodiments, the aggregation rules may include the following exemplary rules defined by a user to aggregate the same types of alarms: (1) Latency metrics: when the metrics consecutively trigger the alarms for N times, only send one alarm within T minutes; (2) Availability metrics: when the availability <A % trigger alarms, only send one alarm within T minutes; (3) calling metrics: if the metric is greater, greater than, equal, small, small than M times within K*5 minutes consecutively for N times, trigger an alarm, only send one alarm within T minutes.

Figure 2:
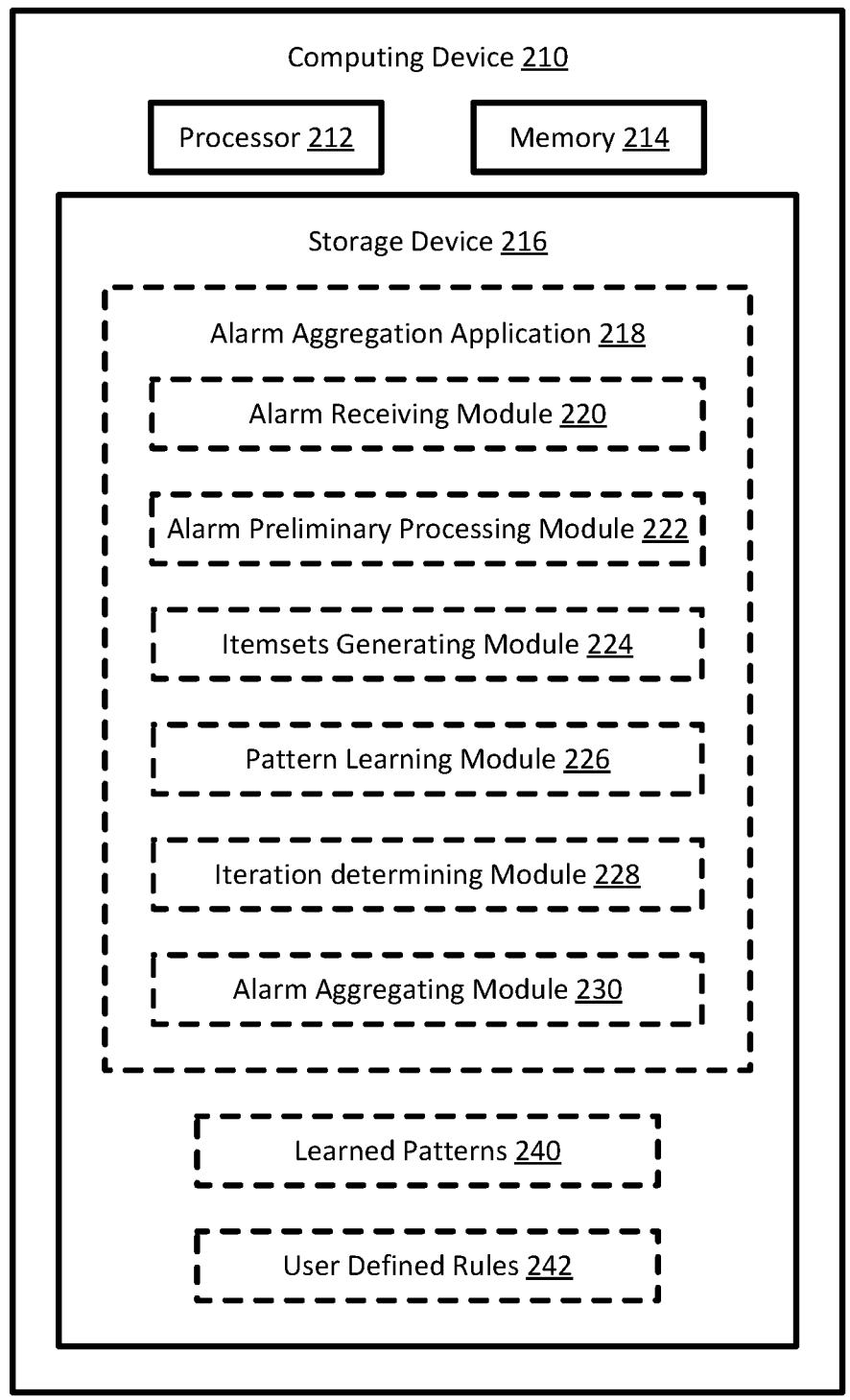
FIG. 2 schematically depicts a system for alarm correlation and aggregation according to certain embodiments of the present disclosure.

FIG. 2 schematically shows a system for alarm correlation and aggregation according to certain embodiments of the present disclosure. In certain embodiments, the system shown in FIG. 2 corresponds to the correlation component, the aggregation component, and the aggregation rules shown in FIG. 1. As shown in FIG. 2, the alarm correlation and aggregation system 200 includes a computing device 210. In certain embodiments, the computing device 210 may be a server computer, a cluster, a cloud computer, a general-purpose computer, or a specialized computer, which can perform alarm aggregation. The computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. In certain embodiments, the computing device 210 is a cloud computer, and the processor 212, the memory 214 and the storage device 216 are shared resources provided over the Internet on-demand.

The processor 212 may be a central processing unit (CPU) which is configured to control operation of the computing device 210. The processor 212 can execute an operating system (OS) or other applications of the computing device 210. In some embodiments, the computing device 210 may have more than one CPU as the processor, such as two CPUs, four CPUs, eight CPUs, or any suitable number of CPUs.

The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214.

The storage device 216 is a non-volatile data storage media for storing the OS (not shown) and other applications of the computing device 210. Examples of the storage device 706 may include non-volatile memory such as flash memory, memory cards, USB drives, hard drives, floppy disks, optical drives, or any other types of data storage devices. In certain embodiments, the computing device 210 may have multiple storage devices 216, which may be identical storage devices or different types of storage devices, and the applications of the computing device 210 may be stored in one or more of the storage devices 216 of the computing device 210. As shown in FIG. 2, the storage device 216 includes an alarm aggregation application 218, learned patterns 240, and user defined rules 242. The alarm aggregation application 218 provides a function of aggregating a large number of alarms of the system 200 into a much smaller number of aggregated alarms using the learned patterns 240 and the user defined rules 242, the learned patterns 240 stores patterns learned by the alarm aggregation application 218, and the user defined rules 242 stores rules or patterns defined by the users.

As shown in FIG. 2, the alarm aggregation application 218 includes, among other things, an alarm receiving module 220, an alarm preliminary processing module 222, an itemsets generating module 224, a pattern learning module 226, an iteration determining module 228, and an alarm aggregating module 230.

The alarm receiving module 220 is configured to receive original alarms generated in the system and send the received alarms to the alarm preliminary processing module 222. In certain embodiments, the system 200 monitors and collects data generated during the operation of the system 200. The data may be communicated as a message queue, where each message may include from which component of the system 200 the message come from, the creator or owner of the message, and the content of the message. The system 200 then uses the alarming rules to process the queued messages to generate the original alarms. Each original alarm is also named an item. The alarm receiving module 220 may then configured to process the original alarms in batch. For example, when the received alarms are for one month or one week, the alarm receiving module 220 may process the original alarms in batches of 24 hours or 12 hours, so that the alarm aggregation application 218 can iteratively process the original alarms batch by batch. As a result, for each batch of the original alarms, the alarm receiving module 220 is configured to send the batch to the alarm preliminary processing module 222. After the iterative processing of the first batch of the original alarms and the update of the learned pattern 240 based on the first batch of original alarms, the alarm receiving module 220 is configured to send the next batch of original alarm data for processing. By processing the original alarms in batches, the alarm data can be aggregated more efficiently with learned patterns that are updated continuously.

In certain embodiments, the alarm preliminary processing module 222 is not necessary, and the alarm receiving module 220 may also send the batch of original alarms directly to the itemsets generating module 224.

The alarm preliminary processing module 222 is configured to, upon receiving the T minutes of original alarm from the alarm receiving module 220, retrieve the user defined rules 242, process the T minutes of original alarm using the user defined rules 242, and send the preliminary processed alarms to the itemsets generating module 224.

The itemsets generating module 224 is configured to, in response to receiving the preliminary processed alarms from the alarm preliminary processing module 222 or receiving the batch of original alarms from the alarm receiving module 220, retrieve the learned pattern 240, use the learned patterns 240 to process the T minutes preliminary processed alarms or the original alarms to obtain generated itemsets, and send the generated itemsets to the pattern learning module 226. Because the alarm aggregation application 218 uses an iteration process, the itemsets generating module 224 may process the same batch of original alarm data several times using different versions of the learned patterns 240. In certain embodiments, when the alarm preliminary processing module 222 is not available, the itemsets generating module 224 may also use both the learned patterns 240 and the user defined rules 242 to process the T minutes of the original alarm data.

In certain embodiments, the itemsets generating module 224 is configured to use a sliding window to generate the itemsets. The itemsets generating module 224 may define a window length or window size, and a step size for the sliding window. In certain embodiments, for different iterations of processing the same T minutes preliminary alarm data, the itemsets generating module 224 may define the same or different window sizes and step sizes. In certain embodiments, the itemsets generating module 224 uses a larger window size for a later of the iterations. In certain embodiments, the itemsets generating module 224 may also define the window size and step size for the first iteration, and calculates the window size and step size the later iterations based on the newly generated rules.

The pattern learning module 226 is configured to, upon receiving the itemsets from the itemset generating module 224 for each iteration, compute learning rules or learning patterns from the itemsets, and sends the learned rules to the iteration determining module 228. In certain embodiments, the pattern learning module 226 is configured to use an apriori algorithm to learn the rules. In certain embodiments, the apriori algorithms is the one proposed by Agrawal and Srikant in Fast Algorithms for Mining Association Rules for Proceedings of the 20th VLDB Conference, 1994, which is incorporated herewith by reference in its entirety. In certain embodiments, the pattern learning module 226 may also use frequent pattern growth (FG-growth) algorithm, equivalence class transformation (Eclat) algorithm or split and merge (SaM) algorithm to learn patterns. In certain embodiments, the pattern learning module 226 is configured to use the same algorithm, such as the apriori algorithms in different iterations.

The iteration determining module 228 is configured to, upon receiving the learned rules from the pattern learning module 226, count the number of iterations of pattern learning by the pattern learning module 226, compare the learned patterns with the learned patterns 240, update the learned patterns 240, and send the result to the itemset generating module 224 or the alarm aggregating module 230. The two criteria here are the number of iterations and whether there is a new learned pattern. The iterations may be terminated if any of the two criteria is met or both of the two criteria are met. In certain embodiments, an iteration limit or threshold Iter is set in advance. In certain embodiments, Iter can be determined based on the number of alarms in the current sliding window. The higher number of alarms, the higher value Iter should be set. For example, Iter is a positive integer in a range of 1-1000. In certain embodiments, Iter is in a range of 30-300. In certain embodiments, Iter depends on the data received.

In certain embodiments, the iteration criterion is predominant over the new pattern criterion. When the iterations is less than the predefined threshold Iter, the iteration determining module 228 further determines whether the newly learned patterns contain a new pattern that is not contained in the learned patterns 240. If the newly learned patterns contain the new pattern, the iteration of pattern learning continues. Specifically, the iteration determining module 228 is configured to update the learned patter 240, and instruct the itemsets generating module 224 to generate an updated itemset using the alarms aggregated in previous iterations or original alarms and the updated rules, so that the pattern learning module 226 can start learning patterns from the newly generated itemsets. If there is no new pattern contained in the learned patterns, the iteration of pattern learning terminate. Specifically, the iteration determining module 228 is configured to instruct the alarm aggregation module 230 to aggregate the original alarms using the current learned patterns 240 and optionally the user defined rules 242.

In certain embodiments, both the criteria should be satisfied to terminate the iterations. When the iterations of pattern learning by the pattern learning module 226 equals to or is greater than Iter and all the learned patterns by the pattern learning module 226 are already contained in the learned pattern 240, the iterations of pattern learning is terminated, and the iteration determining module 228 is configured to instruct the alarm aggregation module 230 to aggregate the original alarms using the current learned patterns 240 and optionally the user defined rules 242. Otherwise, if the iteration is less than Iter, or if the iteration equals to or is greater than Iter, but the learned patterns contains a new pattern when comparing to the learned pattern 240, the iteration of pattern learning continues. The iteration determining module 228 is configured to update the learned patter 240, and instruct the itemsets generating module 224 to generate updated itemsets using the alarms aggregated in previous iterations or the original alarms and the updated learned patterns 240.

The alarm aggregation module 230 is configured to, upon the determination that the iterations of pattern learning is sufficient by the pattern updating module 228, aggregate the original alarms using the most updated learned patterns 240 and optionally the user defined rules 242. As a result, the number of original alarms is reduced dramatically, with the iterative learning of new rules.

Figure 3:
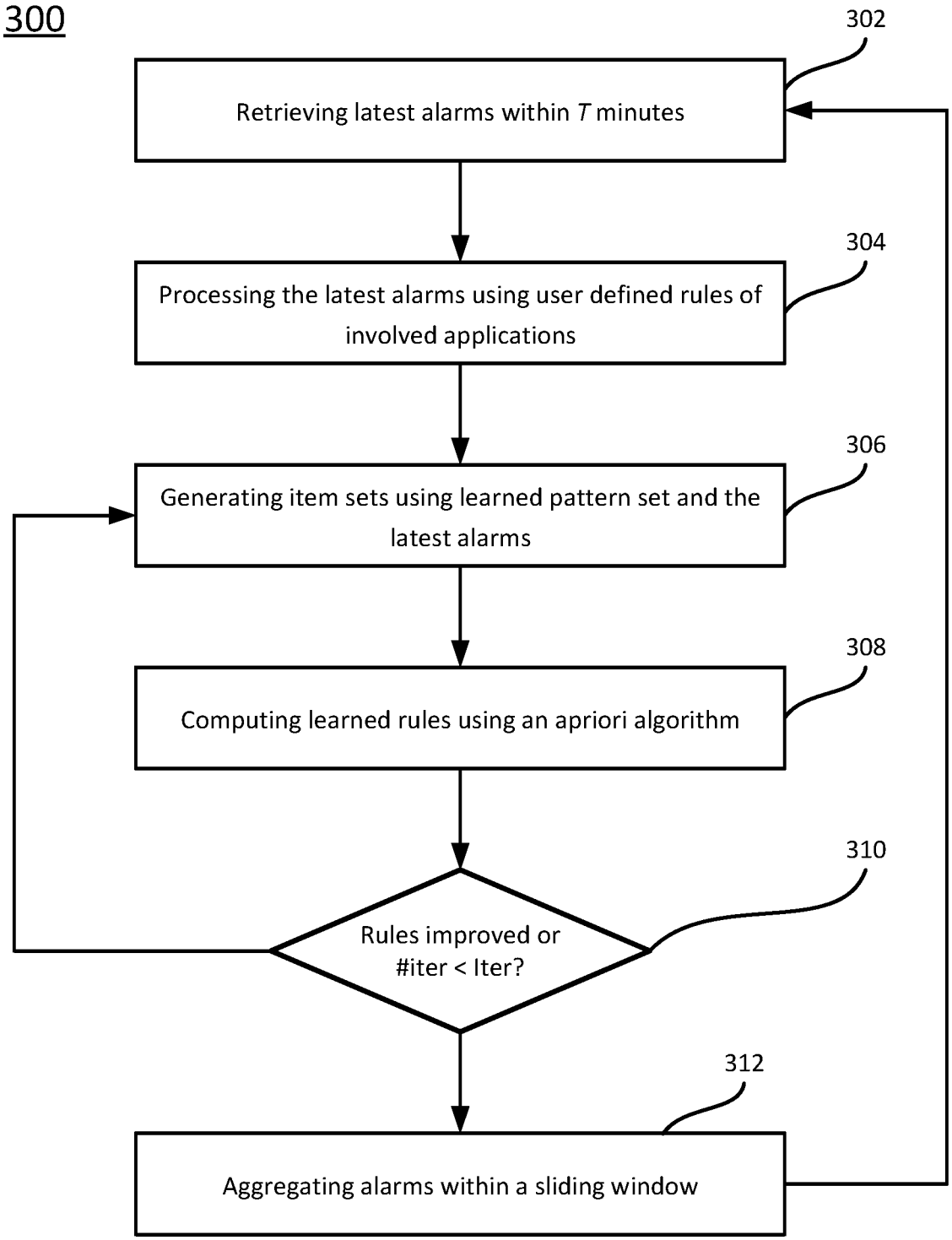
FIG. 3 schematically depicts a method for correlating and aggregating alarms according to certain embodiments of the present disclosure.

FIG. 3 depicts a method for aggregating alarms according to certain embodiment of the present disclosure. In certain embodiments, the method 300 is implemented by the computing device 200 as shown in FIG. 2. It should be particularly noted that, unless otherwise stated in the present disclosure, the steps of the method may be arranged in a different sequential order, and are thus not limited to the sequential order as shown in FIG. 3. Some detailed description which has been discussed previously will be omitted here for simplicity.

As shown in FIG. 3, when the system generates alarms, at procedure 302, the alarm receiving module 220 receives a large amount of generated original alarms in sequence, and sends a batch of the original alarms to the alarm preliminary processing module 222. The batch includes T minutes of alarms. As an example, the total amount of original alarms for processing may be a month or a week of alarm data, and the batch of alarms for the process may be 24 hours or 12 hours of alarms. In other words, the learned patterns 240 is updated for every 24 hours or every 12 hours of alarm data. In this embodiments, the T minutes is 720 minutes, that is, the method 300 processes 720 minutes of alarm data as a batch. At procedure 304, the alarm preliminary processing module 222, upon receiving the T minutes of original alarm from the alarm receiving module 220, retrieves the user defined rules 242, processes the T minutes of original alarm using the retrieved user defined rules 242 to obtain preliminary processed alarms, and sends the preliminary processed alarms to the itesets generating module 224. By this step, the T minutes original alarm data is processed and simplified using the simple rules defined by the user.

Kindly note the procedure 304 is optional and the itemsets generating module 224 may process the T minutes original alarm data directly instead of the T minutes preliminary processed alarms. Further, even if the user defined rules 242 is used, there may not be an independent procedure 304, and the itemsets generating module 224 can use both the learned patterns 240 and the user defined rules 242 at the same time to generate the itemsets.

At procedure 306, upon receiving the T minutes preliminary processed alarms from the alarm preliminary processing module 222, the itemsets generating module 224 retrieves the learned pattern 240, processes the preliminary processed alarms using the learned pattern 240 to obtain generated itemsets, and sends the generated itemsets to the pattern learning module 226. In certain embodiments, during initiation of the procedure 306, the learned pattern 240 may not include any patterns at all, and the itemsets may be the T minutes preliminary processed alarm or the T minutes of original alarms.

In certain embodiments, the itemsets generating module 224 uses a sliding window to generate the itemsets. The itemsets generating module 224 defines a window length or window size, and a step size for the sliding window. In certain embodiments, for different iterations of processing the same T minutes preliminary alarm data, the itemsets generating module 224 defines the same or different window sizes and step sizes. In certain embodiments, the itemsets generating module 224 uses a larger window size for a later of the iterations. In certain embodiments, the itemsets generating module 224 may also define the window size and step size for the first iteration, and calculates the window size and step size in the later iterations based on the newly generated rules. For example, the window size can be changed based on the number of the alarms available. If fewer number of alarms are available, then the window size can be increased to cover N number of alarms.

In certain embodiments, the window size and step size of the initial iteration can be changed across different invocation of the algorithm based on the number of alarms generated. If the number of alarms generated is sparse, the window size can be increased to cover more alarms within the same sliding window. The step size can be set to be proportional to the window size. The idea is to cover sufficient number of alarms to discover meaningful patterns while on the other hand, ensuring the timeliness of alarms sent to users after aggregation.

At procedure 308, upon receiving the generated itemsets, the pattern learning module 226 computes learning patterns from the generated itemsets using an algorithm, and sends the computed learning patterns to the iteration determining module 228. In certain embodiments, the algorithm is apriori algorithm. In certain embodiments, the algorithm may also be FP-growth or Eclat.

At procedure 310, upon receiving the learned rules from the pattern learning module 226, the iteration determining module 228 determines if another iteration of rule learning is needed or not. If needed, the iteration determining module 228 updates the learned patterns 240 and instructs the itemsets generating module 224 to operate; if not needed, the iteration determining module 228 updates the learned patterns 240 and instructs the alarm aggregating module 230 to operate.

In certain embodiments, the iteration determining module 228 makes the determination using two criteria: whether the number of iterations is less than a threshold number "Iter" and whether the newly learned rules include rules addition to the current learned patterns 240. In certain embodiments, the iteration determining module 228 continues another round of iteration when the number of iterations is less than the threshold number Iter and the learned rules include a novel rule in addition to the current learned patterns 240. In certain embodiments, the iteration determining module 228 continues the iteration when the number of iterations is less than the threshold number Iter or the learned rules include a novel rule in addition to the current learned patterns 240.

When another iteration of rule learning is needed, the pattern updating module 228 updates the learned pattern 240 with the newly learned rules, instructs the itemsets generating module 226 to generate itemsets using the updated pattern as described in procedure 306, computes learning rules as described in procedure 308, and makes the determination as described above in this procedure 310. By the new iteration process, new learned rules may be found that are different from the current learned patterns 240.

In certain embodiments, the iteration determining module 228 terminates another round of iteration when the number of iterations equals to or is greater than the threshold number Iter or the all the learned rules are contained in the learned patterns 240. In certain embodiments, the iteration determining module 228 terminates the iteration when the number of iterations equals to is greater than the threshold number Iter, and all the learned rules are contained in the learned patterns 240.

When another iteration of rule learning is not needed, at procedure 312, the iteration determining module 228 notifies the alarm aggregating module 230, and the alarm aggregating module 230 uses the learned patterns 240 to aggregate the T minutes of the alarm data. After that, the method continues to process the next T minutes of the alarm data. It continues when alarms continue to stream into the system.

In certain embodiments, the window sizes and step sizes in the procedures 306, 308 are the same. The window sizes and step sizes between 306/308 and 312 are different from each other. In certain embodiments, the window sizes and step sizes are determined as described above.

In certain aspects, the present disclosure provides a method of processing alarm data at real time. In certain embodiments, when the learned patterns 240 are available, the method may retrieve and use the learned patterns 240 to process real time alarm data. For example, the method may use a 60 second sliding window, and for each 60 seconds of received alarm data, processes the data at real time. The method then processes the next 60 seconds of alarm data when the alarm data are available.

Figure 4A:
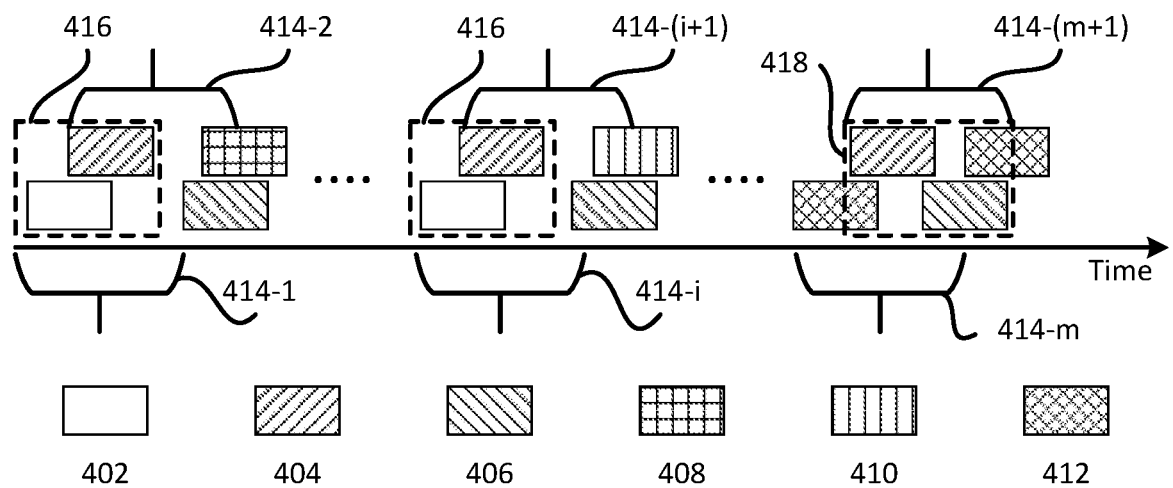
FIG. 4A and FIG. 4B schematically depict aggregation of alarms according to certain embodiments of the present disclosure.
Figure 4B:
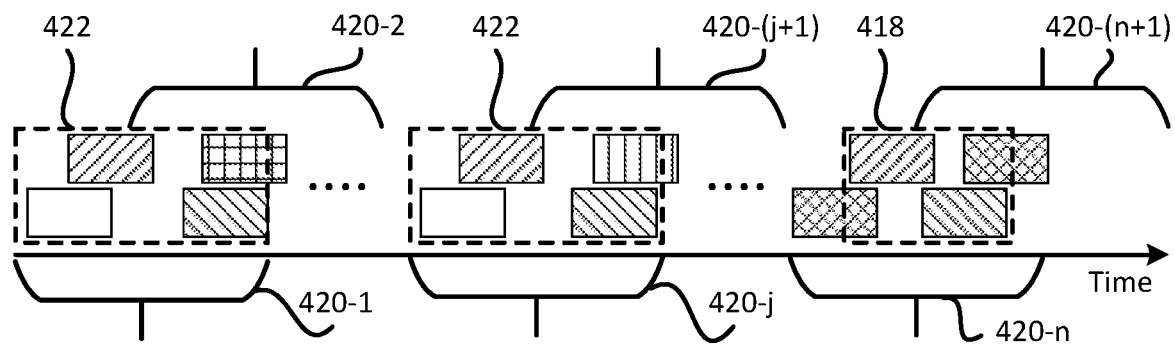

FIG. 4A schematically depicts aggregation of alarms without mining rules or with insufficient mining rules according to certain embodiments of the present disclosure, and FIG. 4B schematically depicts aggregation of alarms using rules learned by iterative frequent itemset mining according to certain embodiments of the present disclosure. In certain embodiments, the aggregation of alarms shown in FIG. 4B corresponds to the procedure 312 in FIG. 3.

As shown in FIG. 4A, the alarm data in time T include alarms 402, 404, 406, 408, 410, 412, etc., and the data are aggregated using sliding windows 414-1, 414-2, . . . , 414-*i*, 414-($i$+1), . . . , 414-*m*, 414-($m$+1). The length of the sliding window, for example, can be in a range of 10 seconds to one hour, such as 30 seconds, 5 minutes, 10 minutes, 15 minutes, 20 minutes or 30 minutes; the step size of the sliding windows can be in a range of 3 seconds-60 minutes. When the step size is smaller than the sliding window length, as shown in FIG. 4A, the neighboring sliding windows have overlaps. The process determines co-occurrence of different alarms, recognizes the rule 416 where the alarm 402 and the alarm 404 are related, and recognizes the rule 418 where the alarms 404 and 406 are related. But the rule correlating the alarms 402, 404 and 406 is not recognized and the three alarms are separated by the sliding windows.

Referring to FIG. 4B, for the same alarm data, the iterative frequent itemset mining process determines co-occurrence of different alarms. In addition to the rules 416 and 418, the iterative frequent itemset mining process can also recognizes the rule 422 where the alarms 402, 404 and 406 are related. Consequently, when the application 218 aggregates the alarms as shown in FIG. 4B, it will adjust the window size based on the rules 416, 418 and 422. As a result, the number of alarms being aggregated as shown in FIG. 4B is greater than the number of alarms being aggregated as shown in FIG. 4A. In one example, a shopping cart overtime alarm and a credit card processing overtime alarm may be generated by different system components or different applications, and thus are not associated by a general data mining program. However, the method according to certain embodiments of the present disclosure is able to determine the relationship, and combine the shopping car overtime alarm and the credit card processing overtime alarm in the same itemset.

Referring to FIG. 4B, the system adjusts the sliding window length by taking into account the associate rules available to avoid separating the alarms that has high probability to be correlated. In certain embodiments, the window size can be determined automatically by program. In particular, the disclosure first uses the associate rules to aggregate alarms that are correlated into one single jumbo alarm. That reduces the available number of alarms. The disclosure then increases the window size to cover the same number of alarms. Note that the size of window is determined by the latency between potentially correlated alarms of applications.

FIG. 5A schematically depicts updating of learned patterns from alarm data according to certain embodiments of the present disclosure. The alarm data has a length of T, which could be in a range of one week to one year, such as one week, two weeks, one month, two months, six months of alarm data. In certain embodiments, the application analyzes the T duration of alarm data periodically for every X minute. The X minutes could be in a range of 5 minutes to 10080 minutes (one week), such as 15 minutes, 30 minutes, 720 minutes (half a day), or 1440 minutes (one day). For each of the X minutes of alarm data, the program runs iteratively. The iteration threshold Iter is set at for example a positive integer in a range of 1-1000. In certain embodiments, the range of Iter is 30-300. In certain embodiments, Iter depends on the data received. The length of the sliding window is set at 180 seconds. In certain embodiments, the step size of the sliding window is set at 0.1, 0.2 or 0.25 times the length of the sliding window. The mine_pattern( ) is a function that invokes the frequent itemset mining algorithm. As shown in FIG. 5A, in line 3, the application begins to run on X minute of alarm data from the T during of alarm data. At lines 6-7, the application uses the 180 seconds sliding window to generate itemsets when pset is empty. At lines 8-9, the application uses the current pattern pset and the 180 second sliding window to generate itemsets from the X minutes of alarm data when pset is not empty. The mined pattern is added to the pset at line 10, and the number of iterations is added by one at line 11. The process of the X minutes of alarm data is repeated, until the iterations equals to or is greater than the threshold Iter and there is not changes to the pset. In certain embodiments, in order to increase the speed of the application, the criteria at line 5 can also be changed, for example by changing "or" to "and." After finishing the pattern learning for the X minutes of alarm data, the learned patterns are added to pset, and the application can further analyze the next X minutes of alarm data to learn new patterns other than the patterns stored in pset.

FIG. 5B schematically depicts aggregation of alarm data according to certain embodiments of the present disclosure. In certain embodiments, the aggregation of the alarms is performed using the patterns learned in FIG. 5A and optionally user defined rules.

In certain embodiments, the aggregation method is also invoked when receiving every alarm in a streaming fashion. In certain embodiments, the alarm array alarm_arr stores the alarms in the current sliding window. When an alarm is received, it is appended to alarm_arr. If the current window length of alarm_arr is less than len_agg, continue. Otherwise, pop out the new alarms from top of alarm_arr head until the current window length of alarm_arr is equal to len_agg. Send out the alarms that are popped. Aggregate alarms of the updated window.

In certain aspects, the present disclosure relates to a method for learning correlation of alarms in multiple hierarchy. Due to the large number of applications within the monitoring system and sparse correlation between applications, naively applying the previous framework can be inefficient to mine good rules. In certain embodiments, the disclosure first separates the alarms by applications and mines association rules within an application. Then the disclosure merges the aggregated alarms together to mine inter application association rules.

In certain embodiments, to improve the efficiency of mining inter-application rules, the disclosure incorporates information provided by a tracing tool such as call graph which provides the invocation relationship between applications. The disclosure can use the invocation relationship to filter out the alarms that does not have correlation within call graph and only mining the alarms that belong to applications within correlations.

The system and method for alarm correlation and aggregation according to certain embodiments of the present disclosure, among other things, have the following advantages: (1) the disclosure can detect correlations between different types of alarms cross applications; (2) the number of alarms can be reduced significantly, this in return reduces the time needed to identify and locate root causes of anomalies and problems; (3) by providing correlations from different alarms, the users can use the correlation to diagnose problems.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] Han, J., Kamber, M., Pei, J., Data mining: concepts and techniques (3rd Edition), 2011, Elsevier.
[2] Gamage, N. K. K., Whitner, R. B., Preventing and servicing system errors with event pattern correlation, 2017, U.S. Pat. No. 9,652,316 B2.
[3] Lam, C., Singh, S., Patil, P. S., et al., Method and apparatus for event correlation based on causality equivalence, 2015, U.S. Pat. No. 9,053,000 B1.
[4] Valdes, A. D. J., Skinner, K., Probabilistic alert correlation, 2011, U.S. Pat. No. 7,917,393 B2.
[5] Yemini, Y., Yemini, S, Kliger, S., Apparatus and method for event correlation and problem reporting, 2001, U.S. Pat. No. 6,249,755 B1.
[6] Debar, H. and Wespi A., Aggregation and correlation of intrusion-detection alerts, International Workshop on Recent Advances in Intrusion Detection 2001, LNCS 2212, pp. 85-103.
[7] Jakobson, G. and Weissman M., Alarm correlation, IEEE Network, 1993, November, pp 52-59.
[8] Lou J. G., Fu, Q., Yang, S., Li, J., Wu, B., Mining program workflow from interleaved traces, 2010, KDD'10: Proceedings of the 16th ACM SIGKDD International Conference on Knowledge Discovery and Data Mining, pp. 613-622.
[9] Luo, C., Lou, J. G., Lin, Q., Fu, Q., Ding, R., Zhang, D., Wang Z., Correlating events with time series for incident diagnosis, 2014, KDD'14: Proceedings of the 20th ACM SIGKDD International Conference on Knowledge Discovery and Data Mining, pp. 1583-1592.
[10] Motahari-Nezhad, H. R., Saint-Paul, R., Casati, F., Benatallah, B., Event correlation for process discovery from web service interaction logs, The VLDB Journal, 2011, DOI 10.1007/s00778-010-0203-9.

What is claimed is:

1. A system comprising a computing device, the computing device comprising a process and a storage device storing computer executable code, wherein the computer executable code, when executed at the processor, is configured to:
provide a plurality of alarms triggered by components of the system;
provide aggregation patterns;
perform iteratively until a criterion is met:
    generating itemsets from the alarms using the aggregation patterns, wherein each itemset comprises one or more of the alarms;
    computing a new aggregation pattern from the generated itemsets using frequent itemset mining; and
    updating the aggregation pattern using the new aggregation pattern to obtain updated aggregation patterns; and
aggregate the alarms using the updated aggregation patterns to obtain aggregated alarms,
wherein the criterion comprises at least one of:
    a number of iterations equals to or is greater than an iteration threshold; and
    the new aggregation pattern is included in the aggregation patterns.

2. The system of claim 1, wherein the iteration threshold is a positive integer in a range of 1-1000.

3. The system of claim 2, wherein the iteration threshold is in a range of 30-300.

4. The system of claim 1, wherein the frequent itemset mining comprises apriori algorithm.

5. The system of claim 4, wherein the step of computing the new aggregation pattern is performed using a sliding window, a window length of the sliding window is in a range of 10 seconds to 60 minutes, and a step size of the sliding window is in a range of one second to 15 minutes.

6. The system of claim 5, wherein the window size is 180 seconds, and the step size is 36 seconds.

7. The system of claim 5, wherein the step of generating itemsets is performed for a plurality of iterations, the window length for a later of the iterations is greater than the window length for an earlier of the iterations.

8. The system of claim 4, wherein the computer executable code is configured to aggregate the alarms using a sliding window, a window length of the sliding window is in a range of 10 seconds to 60 minutes, and a step size of the sliding window is in a range of one second to 15 minutes.

9. The system of claim 1, wherein the computer executable code is configured to aggregate the alarms using both user defined rules and the updated aggregation patterns.

10. The system of claim 1, wherein the computer executable code is further configured to diagnose status of the system using the aggregated alarms.

11. A method comprising:
providing, by a computing device of a system, a plurality of alarms triggered by components of the system;
providing, by the computing device, aggregation patterns;
performing iteratively, by the computing device, until a criterion is met:
    generating itemsets from the alarms using the aggregation patterns, wherein each itemset comprises one or more of the alarms;
    computing a new aggregation pattern from the generated itemsets using frequent itemset mining; and updating the aggregation pattern using the new aggregation pattern to obtain updated aggregation patterns; and aggregating the alarms using the updated aggregation patterns to obtain aggregated alarms;

wherein the criterion comprises at least one of:

a number of iterations equals to or is greater than an iteration threshold; and the new aggregation pattern is included in the aggregation patterns.

12. The method of claim 11, wherein the iteration threshold is a positive integer in a range of 30-300.

13. The method of claim 11, wherein the frequent itemset mining comprises apriori algorithm.

14. The method of claim 13, wherein the step of generating itemsets is performed for a plurality of iterations, a window length for a later of the iterations is greater than a window length for an earlier of the iterations.

15. The method of claim 11, wherein the step of aggregating the alarms is performed using a sliding window, a window length of the sliding window is in a range of 10 seconds to 60 minutes, and a step size of the sliding window is in a range of one second to 15 minutes.

16. The method of claim 11, wherein the step aggregating the alarms is performed using both user defined rules and the updated aggregation patterns.

17. A non-transitory computer readable medium storing computer executable code, wherein the computer executable code, when executed at a processor of a computing device, is configured to:

provide a plurality of alarms triggered by components of a system comprising the non-transitory computer readable medium;

provide aggregation patterns;

perform iteratively until a criterion is met:

generating itemsets from the alarms using the aggregation patterns, wherein each itemset comprises one or more of the alarms;

computing a new aggregation pattern from the generated itemsets using frequent itemset mining; and updating the aggregation pattern using the new aggregation pattern to obtain updated aggregation patterns; and aggregate the alarms using the updated aggregation patterns to obtain aggregated alarms, wherein the criterion comprises at least one of:

a number of iterations equals to or is greater than an iteration threshold; and the new aggregation pattern is included in the aggregation patterns.

18. The non-transitory computer readable medium of claim 17, wherein the step of generating itemsets is performed for a plurality of iterations, the window length for a later of the iterations is greater than the window length for an earlier of the iterations.

* * * * *